United States Patent
Shriver (10) Patent No.: US 6,341,868 B1
(45) Date of Patent: Jan. 29, 2002

(54) IMAGE FORMING APPARATUS AND METHOD FOR LIVE PERFORMANCES

(75) Inventor: Gregory B. Shriver, Durham, NC (US)

(73) Assignee: The Potomac Company, L.L.C., Silverspring, MD (US)

(*) Notice: Subject to any disclaimer, the term of this patent is extended or adjusted under 35 U.S.C. 154(b) by 0 days.

(21) Appl. No.: 09/368,167

(22) Filed: Aug. 5, 1999

(51) Int. Cl.[7] ................................................ G03B 21/28
(52) U.S. Cl. .............................. 353/28; 353/30; 472/58
(58) Field of Search .............................. 353/28, 98, 10, 353/30; 359/629, 630; 472/58, 60, 61

(56) References Cited

U.S. PATENT DOCUMENTS

| | | |
|---|---|---|
| 570,255 A | 10/1896 | Kerner |
| 663,267 A | 12/1900 | Fitch |
| 1,166,701 A | 1/1916 | Mansfeld |
| 1,448,153 A | 3/1923 | Schneider |
| 1,456,233 A | 5/1923 | Hammond et al. |
| 1,636,112 A | 7/1927 | Schufftan |
| 1,636,834 A | 7/1927 | Peters et al. |
| 1,775,237 A | 9/1930 | Dawley et al. |
| 2,054,414 A | 9/1936 | Fleischer |
| 2,310,339 A | 2/1943 | Arndt |
| 2,336,508 A | 12/1943 | Smith et al. |
| 2,402,822 A | 6/1946 | Kraft |
| 2,727,427 A | 12/1955 | Jenkins |
| 2,727,429 A | 12/1955 | Jenkins |
| 2,857,806 A | 10/1958 | Shuftan |
| 2,861,806 A | 11/1958 | Disney |
| 2,870,672 A | 1/1959 | Gage et al. |
| 2,934,601 A | 4/1960 | Oppenheimer |
| 2,952,182 A | 9/1960 | Marks et al. |
| 3,006,241 A | 10/1961 | Marks et al. |
| 3,084,933 A | 4/1963 | Alswang |
| 3,085,799 A | 4/1963 | Alswang |
| 3,180,211 A | 4/1965 | Armstrong |

(List continued on next page.)

FOREIGN PATENT DOCUMENTS

FR   2 714 741   12/1993

Primary Examiner—William Dowling
(74) Attorney, Agent, or Firm—Millen, White, Zelano & Branigan, P.C.

(57) ABSTRACT

An apparatus and method for forming images visible to audiences includes a system for forming virtual images and creating visual effects in a stage setting. This system may include a stage and first and second flat panel video displays. The first flat panel video display is visible to the audience through a portal mirror. The second flat panel video display is not visible to the audience; however, images displayed thereon are reflected off of the portal mirror and outwardly to the audience. Finally, a performance area between the back display and the portal mirror is provided for a person or object whereby the audience may see the composite image of the images from the first and second flat panel video displays and the person or object in the performance area on-stage.

6 Claims, 4 Drawing Sheets

U.S. PATENT DOCUMENTS

| | | |
|---|---|---|
| 3,182,547 A | 5/1965 | Armstrong |
| 3,366,438 A | 1/1968 | Hartman |
| 3,493,290 A | 2/1970 | Traub |
| 3,506,351 A | 4/1970 | Geitz |
| 3,515,454 A | 6/1970 | Paganelli |
| 3,551,043 A | 12/1970 | Neuberger et al. |
| 3,655,272 A | 4/1972 | Valadez |
| 4,190,856 A | 2/1980 | Ricks |
| 4,303,316 A | 12/1981 | McElveen |
| 4,306,768 A | 12/1981 | Egging |
| 4,730,218 A | 3/1988 | Goodrich .................... 358/185 |
| 4,736,214 A | 4/1988 | Rogers |
| 4,738,522 A | 4/1988 | Lunde et al. |
| 4,747,665 A | 5/1988 | O'Brien |
| 4,805,895 A | 2/1989 | Rogers |
| 4,974,957 A | 12/1990 | Kaelin |
| 5,024,521 A | 6/1991 | Zuchowski et al. |
| 5,052,797 A | 10/1991 | Madsen |
| 5,061,061 A | 10/1991 | Robley et al. |
| 5,255,028 A | 10/1993 | Biles |
| 5,329,323 A | 7/1994 | Biles |
| 5,331,359 A * | 7/1994 | Leclercq ...................... 353/28 |
| 5,528,425 A | 6/1996 | Beaver |
| 5,573,325 A | 11/1996 | Lekowski |
| 5,685,625 A | 11/1997 | Beaver |
| 5,790,124 A | 8/1998 | Fischer et al. .............. 345/435 |
| 5,865,519 A * | 2/1999 | Maass ........................ 353/28 |

* cited by examiner

IMAGE FORMING APPARATUS AND METHOD FOR LIVE PERFORMANCES

This invention relates to an apparatus and method for forming images visible to audiences in live stage performances. More specifically, the invention relates to a relatively compact system for forming virtual images and creating visual effects in a stage setting.

BACKGROUND OF THE INVENTION

The art of staging presentations that incorporate optical illusions has been practiced for many years. One of the most popular illusions is created through use of projectors and screens and results in apparent three-dimensional images that a viewing audience sees on-stage during a show or presentation.

These prior art illusion systems can be generally categorized as follows: projections onto gauze or other transparent surfaces; projections on live smoke; three-dimensional film technique; and multiple Blue Room techniques. The categories of systems are discussed in substantial detail in U.S. Pat. No. 4,805,985 to Rogers. The discussion includes detailed explanations of the various different Blue Room techniques.

More recently, changes in technology have allowed for more sophisticated systems with computerized lighting coordinated with projectors. There has even been teaching of combining projection systems with object tracking devices to tie live performances in with the projection system. These types of techniques are described in U.S. Pat. Nos. 5,685,625 and 5,528,425 to Beaver.

Drawbacks with existing technologies noted above include the possible logistic nightmare of a projection system. A screen and projector combination typically requires substantial space between a screen and projector. The combination is also a concern with respect to the registration of the projector itself in relation to the screen. The process of projection convergence and screen alignment is time consuming and requires a skilled technician. In any event, when performing on-stage and using two screens like in Beaver, there must be space between the rear projector and the rear screen as well as space between the second projector and the overhead screen. In smaller auditoriums or meeting places, it is very difficult to try to stage these systems such as, for instance, the Beaver system. Space limitations may require a substantial reduction in the size of the effects area that can be created.

In addition to the foregoing, there are fundamental limitations to projection systems generally. First, the use of lighting on-stage to illuminate a person or actor can wash out the images being projected on the various screens, particularly a back screen. Also, in order to achieve some effects, the screens are movable. Moving screens will require moving projectors and the resulting logistical drawbacks coordinating the projector/screen movement.

Another problem with live presentations is coordinating a live performance with images shown on various screens. The Beaver reference discloses object tracking devices to try to solve this problem, but known tracking systems may not always be reliable. Known tracking systems may also be subject to interference from adjacent metal structures (especially if moving) and from adjacent electrical equipment systems. Tracking systems are also very expensive and difficult to integrate with multiple graphics, video, lighting and other equipment system control software. Rather than using a tracking device, an actor giving a live performance usually must look at an off-stage monitor to see what the audience sees and react accordingly. These side glances can take away from the overall visual effect of a performance. In other words, it is difficult for an actor to see the same composite imagery as the audience, because the actor is in the middle of the composite.

SUMMARY OF THE INVENTION

It is an objection of the present invention, therefore, to overcome the foregoing drawbacks and provide an improved apparatus and method for forming images during live performances.

In one embodiment, an apparatus for displaying visual effects for live presentations involves a stage and a viewing area in which is seated an audience. The stage comprises a foreground side and a background side wherein the foreground side is adjacent the viewing area and the background side is on the side of the stage opposite the foreground side. A back display is comprised of a first flat panel video display wherein the back display is mounted toward the background side of the stage and the first flat panel video display is visible to the audience. A partially-silvered portal mirror is mounted toward the foreground side of the stage at an angle to a vertical plane in front of the audience. A performance area is provided between the back display and the portal mirror. A second flat panel video display that is not visible to the audience displays images that are reflected off of the portal mirror and create a virtual image visible to the audience. The apparatus may further include the portal mirror mounted at an angle so that it is inclined upwardly away from the foreground side of the stage with the second flat panel video display mounted above the stage and above the portal mirror. Alternatively, the portal mirror may be mounted at an angle so that it inclines upwardly toward the foreground side of the stage and a second flat panel video display is mounted below the portal mirror. The apparatus may further include a monitor mirror mounted parallel to the second flat panel video display and on the opposite side of the portal mirror from the second flat panel video display. In a still further embodiment, the apparatus may include an off-stage set including a video camera, a background and a second performance area. The video camera records images from the background and second performance area and feeds those images into the first or second flat panel video displays.

The invention also includes a method for creating visual effects during live presentations comprising a number of steps. First, it includes providing a stage and a viewing area in which an audience is seated. This stage comprises a foreground side and a background side wherein the foreground side is adjacent the viewing area and background side is on the side of the stage opposite the foreground side. A back display comprised of a first flat panel video display is mounted toward the background side of the stage and the first flat panel video display is visible to the audience. The stage further includes a partially-silvered portal mirror wherein the portal mirror is mounted toward the foreground side of the stage and further wherein the portal mirror is mounted at an angle to a vertical plane in front of the audience. A performance area between the back display and the portal mirror is provided. A second flat panel video display that is not visible to the audience displays images that are reflected off the portal mirror and create a virtual image visible to the audience. The method further includes the steps of sending signals to the first and second flat panel video displays that form images thereon visible to the audience. The method further includes placing a person or object in the performance area and directing lights on them so that they are visible to the audience. In this method, the audience simultaneously sees the composite image made up of the images from the first and second flat panel video displays and the person or object placed in the performance area. In a further alternative, the method further includes providing a monitor mirror mounted parallel to the second flat panel video display and on the opposite side of the portal mirror from the second flat panel video display. The method also includes in a further variation of providing an off-stage set comprising a video camera, a background and a second performance area wherein the video camera records images from the background and the second performance area and further wherein those images recorded by the video camera are fed into the first or second flat panel video displays.

DETAILED DESCRIPTION OF PREFERRED EMBODIMENTS

Figure 1:
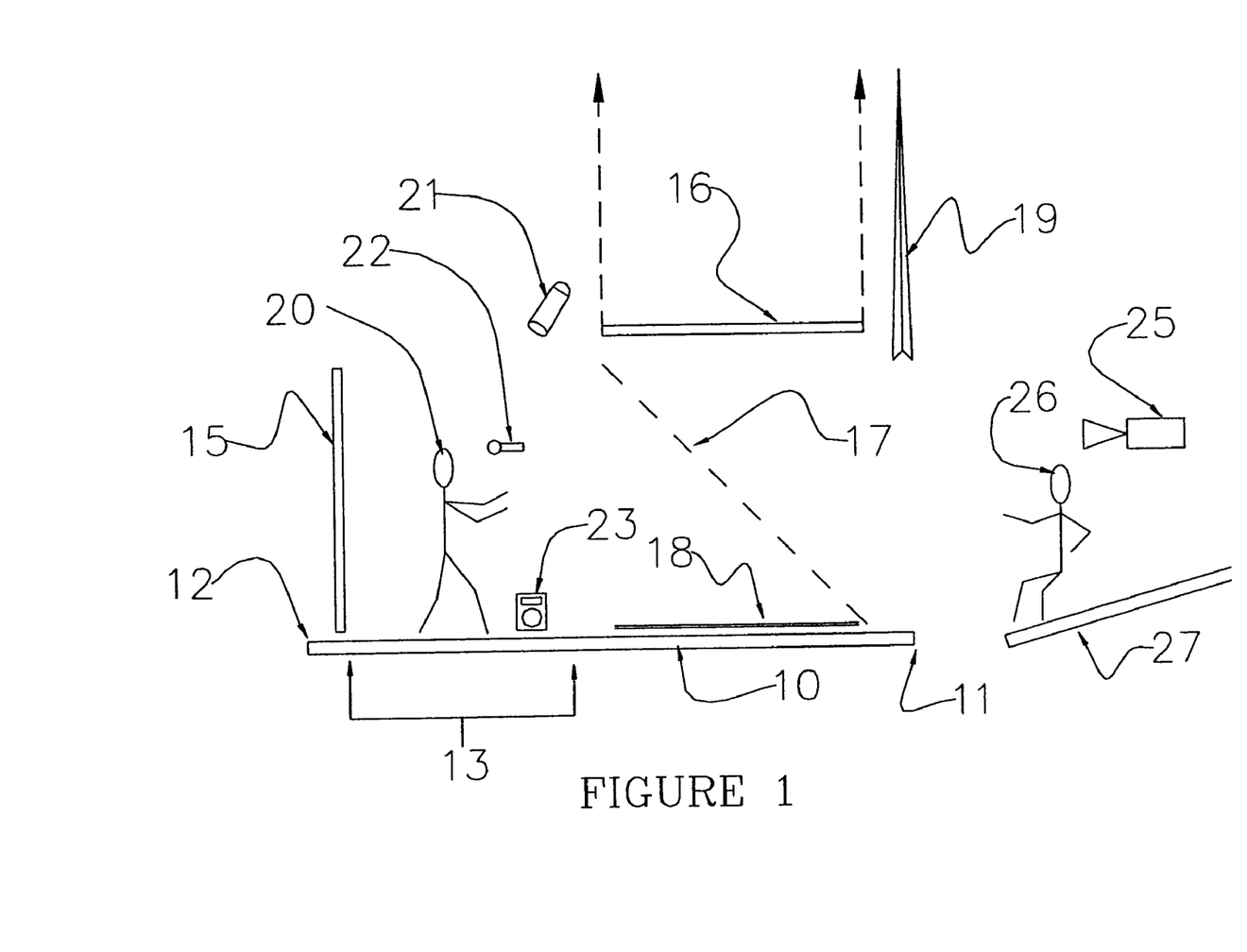
FIG. 1 a schematic side elevation view of an apparatus embodying the present invention.

FIG. 1 illustrates a schematic view of a preferred embodiment the present invention. There is shown a stage 10 having a foreground side 11 and background side 12. The foreground side 11 is adjacent the viewing area 27 in which is seated an audience 26. Toward the background side 12 there is mounted a back display 15. The back display 15 is a flat panel video display. The images that are shown on the back display 15 are visible to the audience 26.

Portal mirror 17 is mounted toward the foreground side 11 of the stage 10. The portal mirror 17 is inclined upwardly away from the foreground side 11 of the stage 10 at an angle to the vertical plane in front of the audience. The portal mirror 17 is only partially silvered. In the preferred embodiment, the portal mirror 17 is 50% silvered thus allowing 50% of light (images) to pass through the mirror 17 such that the audience 26 can see through the portal mirror 17 to see the images on the back display 15.

In between the portal mirror 17 and back display 15 is the portion of the stage 10 referred to as the performance area 13. The performance area 13 is wide enough to allow a person 20 or other object to act or perform on-stage before the audience 26. The person 20 is visible to the audience 26 through the partially-silvered portal mirror 17. The performance area 13 will also typically include a stage monitor loudspeaker 23 and one or more stage microphones 22. Stage lighting 21 illuminates the person 20 or object in the performance area 13.

FIG. 1 further illustrates a second flat panel video display 16 that is mounted above the stage 10 and above the portal mirror 17. The second flat panel video display 16, or overhead display, is further mounted behind a proscenium drape 19 or other curtain so that the audience 26 cannot observe the overhead display. Images that are displayed on the overhead display 16 are reflected off of the portal mirror and outwardly towards the audience 26. The apparatus further includes a monitor mirror 18 that is mounted underneath the portal mirror and parallel to the overhead display 16. The monitor mirror 18 is fully silvered. Because the portal mirror 17 is only partially silvered, a portion of the intensity of the image projected on the overhead display 16 reflects out to the audience, and the remaining intensity of the image passes through the portal mirror 17 and is reflected back upwardly by the monitor mirror 18. A portion of that reflection is then reflected backwardly to the person 20 acting or performing in the performance area 13.

Preferably, the partially silvered mirror is 50% silvered. Therefore, 50% of the light (image) striking the surface of the portal mirror 17 is reflected off the mirror and changed in direction according to the angle of inclination of the mirror, i.e., outwardly towards the audience 26. The other 50% of the light passes straight through the half-silvered mirror. In operation, therefore, this one-half of the image from the overheard display 16 passes straight through the portal mirror 17 hitting the floor underneath it where the monitor mirror 18 is placed. This one half of the image brightness bounces straight back up and hits the underside of the portal mirror 17 and is one half reflected back toward the person on-stage. The image from the background display 15 does the same thing as the image from overhead display 16. Fifty percent of the light (image) goes straight through the portal mirror 17 and out to the audience 26. The other 50% is bounced onto the monitor mirror 18 and back into the underside of the portal mirror 17. Fifty percent of that reflected image can then also be seen by the performer. The light 21 illuminating the person on-stage also passes 50% out towards the audience 26 while the other half is directed onto the monitor mirror 18 and reflected back up off of the underside of the portal mirror 17 back to the performer. With this system, therefore, the person 20 in the performance area 13 is able to see the same image that the audience 26 sees. The only difference is that the person 20 only sees half of the brightness of the composite image that the audience 26 sees. The composite image is a combination of reflections from the monitor mirror 18 including the overhead display 16, background display 15 and stage person/object 20. The obvious benefit of the monitor mirror 18, therefore, is that the person 20 in the performance area 13 is able to follow exactly how everything is appearing to the audience without having to view an off-stage monitor or otherwise guess what the composite images looks like.

Figure 2:
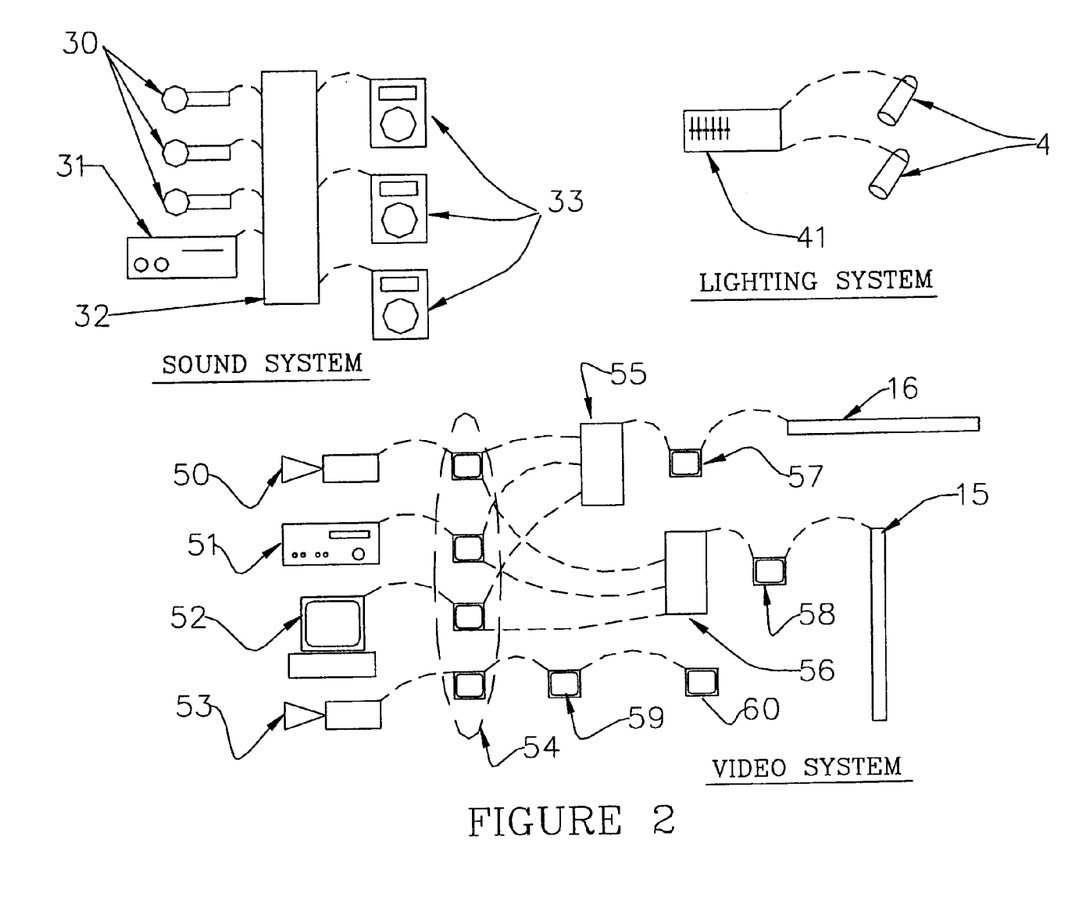
FIG. 2 is a flow chart diagram of the sound, lighting and video systems used to actuate the present invention.

FIG. 2 demonstrates schematically the sound, lighting and video systems that may be used in connection with a preferred embodiment of the image forming apparatus. The sound system can be made up of a series of different microphones 30 and playback devices 31 that are fed into a mixer and amplifier system 32. The mixer and amplifier 32 then sends the music out through various loudspeakers 33. The microphones 30 may be placed in the performance area 13, before an off-stage announcer, and/or in an off-stage set. Obviously, the playback device 31 or devices may play prerecorded messages. The loudspeakers 33 may be positioned for the audience to hear, as a stage monitor speaker, and/or at an off-stage set.

The lighting system is made up of a lighting controller and dimmer system 41 connected to the various lighting hardware 40. The lighting controller 41 may control both on-stage and off-stage lighting elements.

The video system may incorporate several different input components. These components may include an off-stage camera 50, a video playback 51, a graphics video device 52, and/or an audience view camera 53. The system may also include more than one of each of these input components. Those signals are observed by operators on the source monitors 54 prior to or contemporaneous with utilizing the signals in the video controllers 55 and 56. The overhead video display controller 55 receives input from one or more of the graphics video source 32, video playback source 51, or off-stage camera 50. Likewise, the back panel display video controller 56 receives input from one or more of the same components. Those controllers 55 and 56 are connected to video monitors 57 and 58 that are likewise connected to the overhead display 16 and background display 15. The audience camera 53 is fed to a stage monitor 59 and/or to an off-stage set monitor 60.

Figure 3:
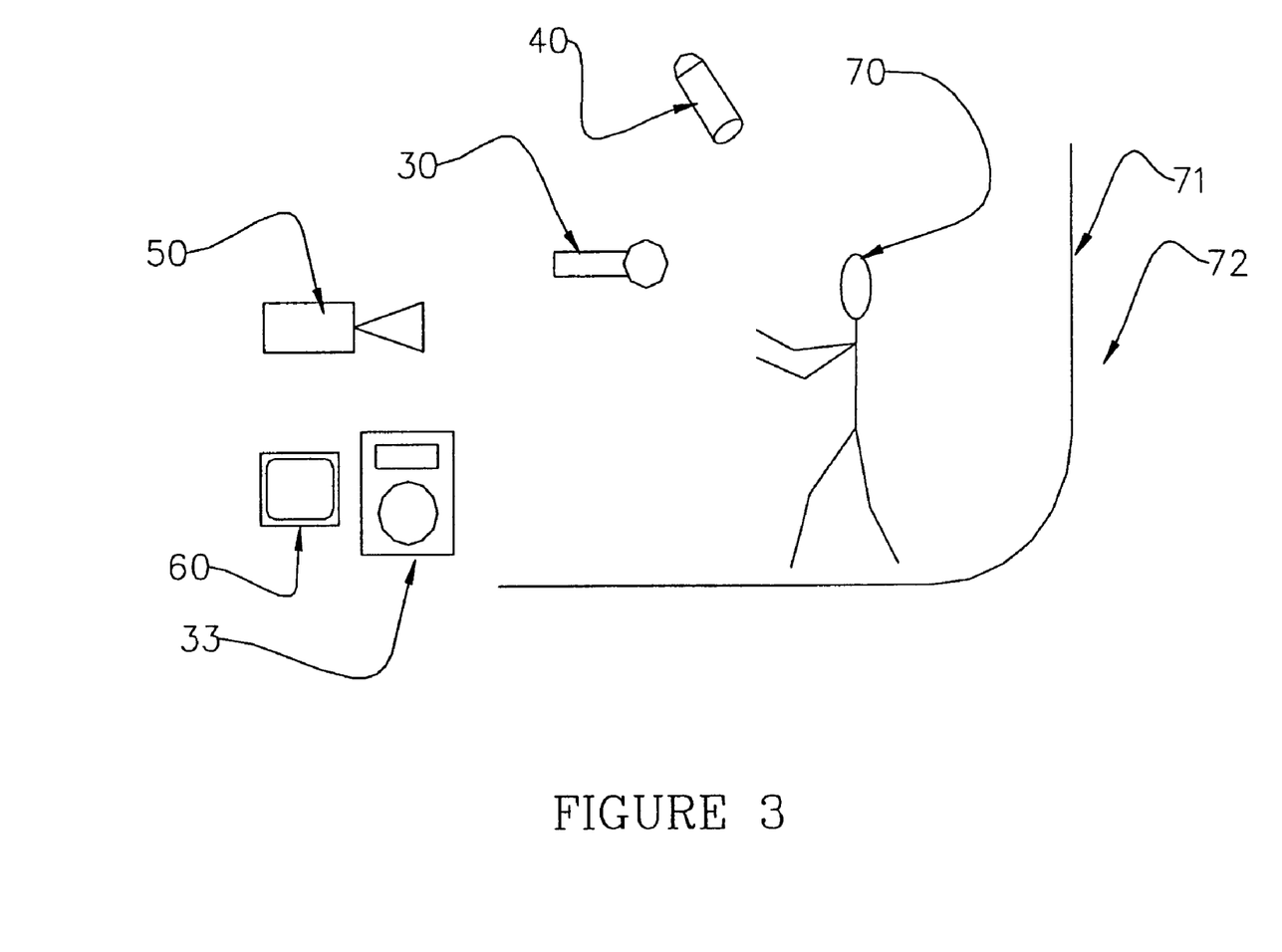
FIG. 3 is a side elevation schematic view of an off-stage set that may be used in connection with the present invention.

FIG. 3 illustrates a schematic of an off-stage set 72. The off-stage set includes video camera 50 that captures what is going on the off-stage set 72 so that it may be optionally input onto one or both of the display panels 15 and 16 on the stage 10. The off-stage set includes an off-stage person 70 and, optionally, a background 71. The background 71 will often be a primary color which is then subtracted from the final signal in a well-known process called "keying" that is familiar to those of skill in the art. The off-stage set 72 further includes a microphone 30 and lighting 40 as well as an off-stage set speaker 33. A monitor 60 allows the person 70 to see what is happening on-stage 10, because the monitor 60 is receiving input from the audience view camera 53.

Loudspeakers and microphone placements on both the main stage and the off-stage set are positioned so that offstage performers and on-stage performers may interact together in real time in addition to whatever playback sources may also be utilized. Also, the lighting on the off-stage set is carefully controlled so that the transmitted off-stage image will appear similar to the images seen on the main stage to better carry off the virtual image seen by the audience.

Figure 4:
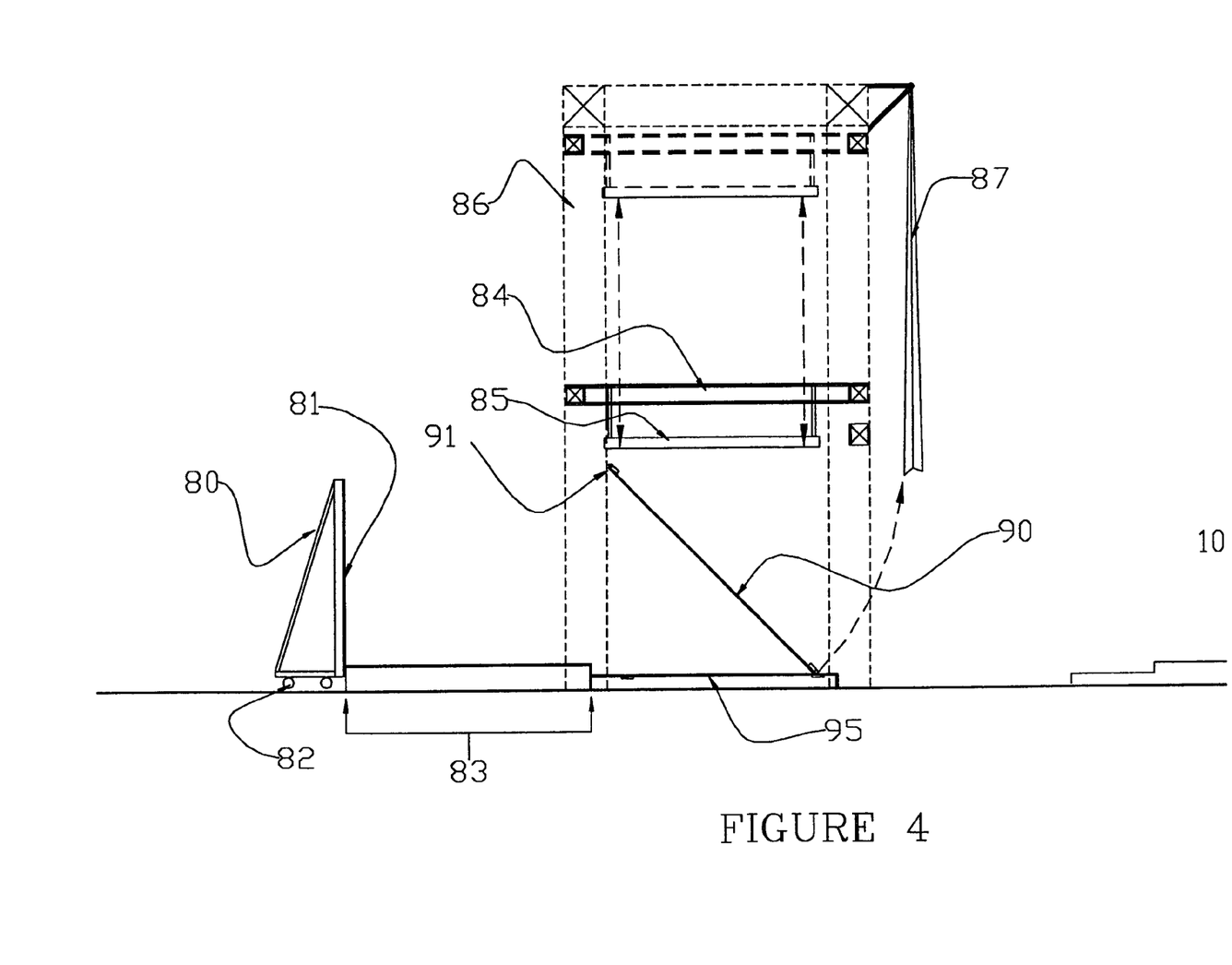
FIG. 4 is a side elevation schematic view of an apparatus embodying the present invention.

FIG. 4 sets forth in more structural detail the stage 10. The back display 80 includes the panel display 81 on a frame and roller 82. This allows the display 80 to be moved laterally and forward and backwards with respect to the audience. The rollers 82 also allow for easy access to placing large objects on and off the performance area 83. In a preferred embodiment, the flat panel video display 81 is nine feet tall and 12–16 feet wide. Typically, the screen is approximately 4–24 inches thick. Manufacturers of suitable video displays include Sony and Lighthouse Technologies, Inc. Preferably, the surface of the video display 81 includes a surface that diffuses or scatters incident light from the stage or elsewhere and does not reflect off of the display surface.

The second flat panel video display 85, also referred to as the overhead display, is suspended from and supported by frame 84. Frame 84 is attached to trusses 86 that allows for the overhead display 85 to move up and down in the vertical direction in planes parallel to the plane defined by the display itself. Alternatively, not shown, the overhead display 85 may be suspended from the frame 84 so that the display 85 may move about within the plane defined by the video display 85 itself. In other words, the vertical height of the display would not change, but the horizontal position could be varied. In a further alternative, not shown, the display 85 may be moved about to planes not parallel to the plane of the display shown. Various asymmetrical or unbalanced images may be reflected to the audience. The total height that the overhead display 85 may move and is equal to at least the depth of the performance area 83 of the stage such that the images perceived by the audience 26 from the displays 15 and 16 may be arranged, when desired, to appear superimposed in the same virtual place. In a preferred construction, the performance area is twelve feet deep. Therefore, the overhead display 85 can move upward and downward twelve feet. The truss columns 86 are spaced fifteen feet apart on their outside edges. Finally, a proscenium drapery 87 covers the front of the apparatus so that the overhead display 85 and supporting framework 84 can not been seen by the audience viewing from audience area 100. The length and width of the overhead display 85 are preferably comparable to the dimensions of the back display 81.

The portal mirror 90 is tilted at approximately a 45° angle to the vertical plane in front of the audience. The height of the portal mirror 90 is 14 feet, 4 inches. The portal mirror is comprised of stretched optical films that have been metalized to the point that they are 50% silvered. Fifty percent silvered is preferable, because many desirable effects rely heavily on the fact that images on either the overhead display or background display cannot be readily discerned from each other. The stretched optical films allows the mirror to be light weight and relatively easily replaceable. Certainly, it is easier to handle then an actual glass mirror. The portal mirror 90 is fitted with a hinged mounting and articulation mechanism 91, so that the mirror 90 can be rotated upwardly. As the portal mirror swings up, persons or things can move onto and off of the stage and into the audience area. The monitor mirror 95 is also made up of stretched optical film. It has the same dimensions as the overhead display 85. The monitor mirror film is 100% silvered to reflect all the light that it receives. Acceptable films that may be used include Mylar polyester The height of the portal mirror 90 and the height of the back display 80 may vary at the preference of a presentation designer. With respect to the height of the back display 80, it should be no less than six feet to accommodate the height of an average person in the performance area 83. Similarly, the length of the portal mirror 90 should be no less than about 9½ feet in order to be vertically high enough (when mounted at a 45° angle) to be as tall as an average six feet tall person. Alternatively, if a portal mirror is mounted other than at the 45° angle shown, the length of the portal mirror can be adjusted with the angle in order to cover the preferable minimum six foot height. Actors or objects in the performance area that are taller than six feet (as described) or even nine feet (as shown in FIG. 4) will require proportionate adjustments to the height and length of a back display and portal mirror.

The system described herein can be adapted to various different situations depending on the locational requirements. For instance, if there is little or no overhead space in which to mount a truss frame work, then the second flat panel video display can be mounted parallel to or below the floor of the stage. In that case, the portal mirror would be mounted so that it inclines toward the audience and reflects the images from underneath outwardly towards the audience. Further alternatively, if the location requirements demanded, then the second flat panel video display could be placed vertically like the back display but in the right or left hand wing of the stage. In this way, the portal mirror would be vertical in the side elevation yet angled in a top or bottom view.

In further variations of the invention, the degree of silvering of the portal mirror can be varied so that images that are reflected off of the portal mirror can be given a different "look" or "texture" to the audience. Further, although the preferred embodiments illustrated in the drawings show the overhead panel display parallel to the plane of the stage, the second flat panel display could be at an angle and the portal mirror angle adjusted accordingly. This could provide further flexibility with respect to the auditorium or location where the images will be formed.

While the invention has been described with reference to specific embodiments thereof, it will understood that numerous variations, modifications and additional embodiments are possible, and accordingly, all such variations, modifications, and embodiments are to be regarded as being within the spirit and scope of the invention.

What is claimed is:

1. Apparatus for displaying visual effects for live presentations involving a stage and a viewing area in which is seated an audience comprising:

the stage comprising a foreground side and a background side wherein the foreground side is adjacent the viewing area and the background side is on the side of the stage opposite the foreground side;

a back display comprised of a first flat panel video display wherein the back display is mounted towards the background side of the stage and the first flat panel video display is visible to the audience;

a partially-silvered, portal mirror wherein the portal mirror is mounted toward the foreground side of the stage and further wherein the portal mirror is mounted at an angle to a vertical plane in front of the audience and at an angle so that is inclined upwardly away from the foreground side of the stage;

a performance area between the background display and the portal mirror; and a second flat panel video display that is not visible to the audience and is mounted above the stage and above the portal mirror wherein the images appearing on the second flat panel video display are reflected off of the portal mirror and create a virtual image visible to the audience and further wherein the second flat panel video display is mounted parallel to the stage and further comprising a monitor mirror lying flat on the stage beneath the portal mirror;

whereby the audience can see one or both of the images from the first and second flat panel video displays and a person or object placed in the performance are and a whereby a person in the performance area can see the same composite imagery as the audience.

2. Apparatus for displaying visual effects for live presentations involving a stage and a viewing area in which is seated an audience comprising:

the stage comprising a foreground side and a background side wherein the foreground side is adjacent the viewing area and the background side is on the side of the stage opposite the foreground side;

a back display comprised of a first flat panel video display wherein the back display is mounted towards the background side of the stage and the first flat panel video display is visible to the audience;

a partially-silvered, portal mirror wherein the portal mirror is mounted toward the foreground side of the stage and further wherein the portal mirror is mounted at an angle to a vertical plane in front of the audience and at an angle so that is inclined upwardly towards the foreground side of the stage;

a performance area between the background display and the portal mirror;

a second flat panel video display that is not visible to the audience and is mounted below the portal mirror wherein the images appearing on the second flat panel video display are reflected off of the portal mirror and create a virtual image visible to the audience; and a monitor mirror mounted parallel to the second flat panel video display and above the portal mirror;

whereby the audience can see one or both of the images from the first and second flat panel video displays and a person or object placed in the performance area and whereby a person in the performance area can see the same composite imagery as the audience.

3. Apparatus for displaying visual effects for live presentations involving a stage and a viewing area in which is seated an audience comprising:

the stage comprising a foreground side and a background side wherein the foreground side is adjacent the viewing area and the background side is on the side of the stage opposite the foreground side;

a back display comprised of a first flat panel video display wherein the back display is mounted towards the background side of the stage and the first flat panel video display is visible to the audience;

a partially-silvered, portal mirror wherein the portal mirror is mounted toward the foreground side of the stage and further wherein the portal mirror is mounted at an angle to a vertical plane in front of the audience;

a performance area between the background display and the portal mirror;

a second flat panel video display that is not visible to the audience wherein the images appearing on the second flat panel video display are reflected off of the portal mirror and create a virtual image visible to the audience; and a monitor mirror mounted parallel to the second flat panel video display and on the opposite side of the portal mirror from the second flat panel video display;

whereby the audience can see one or both of the images from the first and second flat panel video displays and a person or object placed in the performance area.

4. Apparatus for displaying visual effects for live presentations involving a stage and a viewing area in which is seated an audience comprising:

the stage comprising a foreground side and a background side wherein the foreground side is adjacent the viewing area and the background side is on the side of the stage opposite the foreground side;

a back display comprised of a first flat panel video display wherein the back display is mounted towards the background side of the stage and the first flat panel video display is visible to the audience;

a partially-silvered, portal mirror wherein the portal mirror is mounted toward the foreground side of the stage and further wherein the portal mirror is mounted at an angle to a vertical plane in front of the audience;

a performance area between the background display and the portal mirror;

a second flat panel video display that is not visible to the audience wherein the images appearing on the second flat panel video display are reflected off of the portal mirror and create a virtual image visible to the audience; and wherein the flat panel video displays are moveable within the same planes as defined by the respective flat panel video displays themselves;

whereby the audience can see one or both of the images from the first and second flat panel video displays and a person or object placed in the performance area.

5. The apparatus described in claim 4 further wherein the flat panel video displays are moveable to planes parallel to the planes defined by the respective flat panel video displays themselves.

6. A method for creating visual effects during live performances comprising the following steps:

providing a stage and a viewing area in which an audience is seated comprising
- a) the stage comprising a foreground side and a background side wherein the foreground side is adjacent the viewing area and the background side is on the side of the stage opposite the foreground side;
- b) a back display comprised of a first flat panel video display wherein the back display is mounted towards the background side of the stage and the first flat panel video display is visible to the audience;
- c) a partially-silvered, portal mirror wherein the portal mirror is mounted toward the foreground side of the stage and further wherein the portal mirror is mounted at an angle to a vertical plane in front of the audience;
- d) a performance area between the background display and the portal mirror;
- e) a second flat panel video display that is not visible to the audience wherein the images appearing on the second flat panel video display are reflected off of the portal mirror; and
- f) a monitor mirror mounted parallel to the second flat panel video display and on the opposite side of the portal mirror from the second flat panel video display;

sending signals to the first and second flat panel video displays that form images thereon visible to the audience; and placing a person or object in the performance area and directing lights on them so they are visible to the audience, whereby the audience simultaneously sees the composite image made up of the images from the first and second flat panel video displays and the person or object placed in the performance area.

* * * * *